(12) United States Patent
Benoit et al.

(10) Patent No.: US 10,009,763 B2
(45) Date of Patent: Jun. 26, 2018

(54) FLEXIBLE CONFIGURATION AND AUTHENTICATION OF WIRELESS DEVICES

(71) Applicant: QUALCOMM Incorporated, San Diego, CA (US)

(72) Inventors: Olivier Jean Benoit, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/615,670

(22) Filed: Jun. 6, 2017

(65) Prior Publication Data

US 2017/0272942 A1    Sep. 21, 2017

Related U.S. Application Data

(62) Division of application No. 15/065,608, filed on Mar. 9, 2016, now Pat. No. 9,706,397.

(Continued)

(51) Int. Cl.
| | |
|---|---|
| *H04M 3/16* | (2006.01) |
| *H04W 12/04* | (2009.01) |
| *H04L 29/06* | (2006.01) |
| *H04L 9/00* | (2006.01) |
| *H04L 9/08* | (2006.01) |

(Continued)

(52) U.S. Cl.
CPC ............ *H04W 12/04* (2013.01); *H04L 9/006* (2013.01); *H04L 9/0841* (2013.01); *H04L 63/062* (2013.01); *H04W 12/06* (2013.01); *H04L 9/3265* (2013.01); *H04W 4/008* (2013.01); *H04W 4/80* (2018.02); *H04W 12/02* (2013.01)

(58) Field of Classification Search
CPC .................................................... H04W 12/04
See application file for complete search history.

(56) References Cited

U.S. PATENT DOCUMENTS

| | | | |
|---|---|---|---|
| 2007/0058808 A1* | 3/2007 | Rudolf ................. | H04L 9/0841 380/44 |
| 2010/0211790 A1* | 8/2010 | Zhang .................... | H04L 9/321 713/171 |

(Continued)

FOREIGN PATENT DOCUMENTS

WO    WO-2010023506 A1    3/2010

OTHER PUBLICATIONS

International Search Report and Written Opinion—PCT/US2016/031036—ISA/EPO—dated Aug. 17, 2016.

*Primary Examiner* — Justin Lee
(74) *Attorney, Agent, or Firm* — Paradice & Li LLP

(57) ABSTRACT

An apparatus and method for configuring a wireless station for use within a wireless local area network are disclosed. In at least one exemplary embodiment, a pairwise master key is generated by the wireless station and an access point within the wireless local area network. The pairwise master key may be based, at least in part, on a transient identity key pair of the wireless station. The transient identity key pair may be generated by the wireless station in response to receiving a message from the access point. In some embodiments, a public transient identity key of the transient identity key pair may be provided to additional access points to enable the wireless station to authenticate with the additional access points.

24 Claims, 7 Drawing Sheets

Related U.S. Application Data

(60) Provisional application No. 62/171,548, filed on Jun. 5, 2015.

(51) Int. Cl.
*H04W 12/06* (2009.01)
*H04L 9/32* (2006.01)
*H04W 12/02* (2009.01)
*H04W 4/00* (2018.01)
*H04W 4/80* (2018.01)

(56) References Cited

U.S. PATENT DOCUMENTS

| | | |
|---|---|---|
| 2012/0284517 A1 | 11/2012 | Lambert |
| 2014/0013406 A1* | 1/2014 | Tremlet .................. G06F 21/32 726/5 |
| 2014/0331043 A1 | 11/2014 | Cho et al. |
| 2014/0376721 A1 | 12/2014 | Perez et al. |
| 2015/0113277 A1 | 4/2015 | Harkins |
| 2016/0360404 A1 | 12/2016 | Benoit |
| 2017/0142082 A1* | 5/2017 | Qian ..................... H04L 63/061 |

\* cited by examiner

FLEXIBLE CONFIGURATION AND AUTHENTICATION OF WIRELESS DEVICES

CROSS-REFERENCE TO RELATED APPLICATION

The present application is a divisional of U.S. patent application Ser. No. 15/065,608 entitled "FLEXIBLE CONFIGURATION AND AUTHENTICATION OF WIRELESS DEVICES" filed Mar. 9, 2016, which claims priority to U.S. Provisional Patent Application No. 62/171,548 entitled "CONFIGURING A CLIENT DEVICE USING A TRANSIENT PUBLIC KEY AFTER AN INITIAL CONFIGURATION" filed Jun. 5, 2015, the entireties of which all are incorporated by reference herein.

TECHNICAL FIELD

The example embodiments relate generally to communication systems, and specifically to configuring a wireless device for use within wireless networks.

BACKGROUND OF RELATED ART

A wireless local area network (WLAN) may be formed by one or more access points (APs) that provide a shared wireless communication medium for use by a number of client devices or stations. Each AP, which may correspond to a Basic Service Set (BSS), periodically broadcasts beacon frames to enable any client devices within wireless range of the AP to establish and/or maintain a communication link (e.g., a communication channel) with the WLAN.

In some WLANs, a client device may be configured for use with the one or more APs in the WLAN using a public key encryption algorithm. Public key encryption (sometimes referred to as public/private key encryption) is a method of securely transferring data using a known (public) and a secret (private) key. The public and private keys typically have a mathematical relationship with each other. In addition to transferring data, the public and private keys may verify messages and certificates, and generate digital signatures. For example, the client device may share a public key (e.g., a public encryption key of the client device) with APs within the WLAN. The APs may use the client device's public key to authenticate and configure the client device. Once authenticated, the client device may access (e.g., connect to) the APs within the WLAN. However, controlling access of the client device to the WLAN may be difficult after distribution of the client device's public key.

Accordingly, it may be desirable to improve access control of the client device to the WLAN.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In some aspects, a method of configuring a wireless station for use in a wireless network is disclosed. In accordance with example embodiments, a wireless station may dynamically generate a first public and private key pair. The wireless station may also generate a first shared key. The first shared key may be based, at least in part, on the first public and private key pair. The wireless station may communicate with the access point using the first shared key.

In another aspect, a wireless device is disclosed that may include a transceiver, a processor and a memory to store instructions that, when executed by the processor, causes the wireless device to: dynamically generate a first public and private key pair; generate a first shared key, based at least in part, on the first public and private key pair; and communicate with an access point using the first shared key.

In another example embodiment, a method of configuring a wireless station for use with an access point is disclosed. The access point may transmit a discovery message. The access point may then receive a dynamically generated first public key in response to the discovery message. The access point may generate a first shared key based, at least in part, on a public key associated with the access point and the first public key. The access point may then communicate with the client device using the first shared key.

A wireless device is disclosed that may include a transceiver, a processor, and a memory to store instructions that when executed by the processor causes the wireless device to: transmit a discovery message and receive a dynamically generated first public key in response to the first message. The wireless device may generate a first shared key based, at least in part, on a public key associated with the wireless device and the first public key. The wireless device may communicate with the wireless station using the first shared key.

BRIEF DESCRIPTION OF THE DRAWINGS

The example embodiments are illustrated by way of example and are not intended to be limited by the figures of the accompanying drawings.

Like reference numerals refer to corresponding parts throughout the drawing figures.

DETAILED DESCRIPTION

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of client devices, the example embodiments are equally applicable to other WLAN systems including, for example, multiple WLANs, peer-to-peer (or Independent Basic Service Set) systems, Wi-Fi Direct systems, and/or Hotspots.

In the following description, numerous specific details are set forth such as examples of specific components, circuits, and processes to provide a thorough understanding of the present disclosure. The term "coupled" as used herein means connected directly to or connected through one or more intervening components or circuits.

In addition, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

Figure 1:
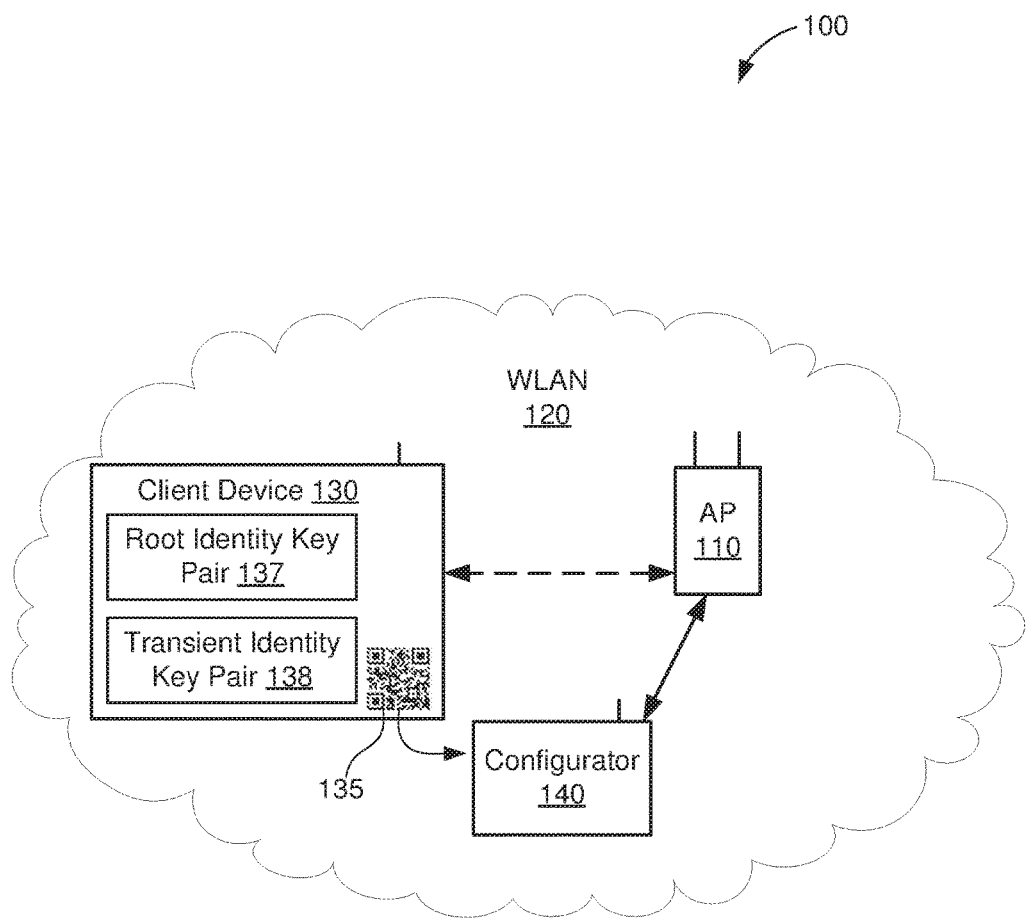
FIG. 1 shows a block diagram of a wireless system within which the example embodiments may be implemented.

FIG. 1 is a block diagram of a wireless system 100 within which the example embodiments may be implemented. The wireless system 100 may include a client device 130, a wireless access point (AP) 110, a configurator 140, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that the WLAN 120 may be formed by any number of access points such as the AP 110. In a similar manner, although only one client device 130 is shown in FIG. 1 for simplicity, the WLAN 120 may include any number of client devices. For some embodiments, the wireless system 100 may correspond to a single user multiple-input multiple-output (SU-MIMO) or a multi-user MIMO (MU-MIMO) wireless network. Further, although the WLAN 120 is depicted in FIG. 1 as an infrastructure BSS (IBSS), for other example embodiments, the WLAN 120 may be an IBSS, an ad-hoc network, or a peer-to-peer (P2P) network (e.g., operating according to Wi-Fi Direct protocols).

Each of the client device 130 and the configurator 140 may be any suitable Wi-Fi enabled wireless device including, for example, a cell phone, personal digital assistant (PDA), tablet device, laptop computer, or the like. The client device 130 and/or the configurator 140 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For some embodiments, the client device 130 and/or the configurator 140 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 3, 4, and 6.

The AP 110 may be any suitable device that allows one or more wireless devices to connect to a network (e.g., a local area network (LAN), wide area network (WAN), metropolitan area network (MAN), and/or the Internet) via the AP 110 using Wi-Fi, Bluetooth, or any other suitable wireless communication standards. For at least one embodiment, the AP 110 may include one or more transceivers, one or more processing resources (e.g., processors and/or ASICs), one or more memory resources, and a power source. In some embodiments, the AP 110 may also be any suitable Wi-Fi and network enabled device including, for example, a cell phone, PDA, tablet device, laptop computer, or the like. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 3, 4, and 6.

For the AP 110, the client device 130, and the configurator 140, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the client device may be any technically feasible transceiver such as a ZigBee transceiver described by a specification from the ZigBee specification, a WiGig transceiver, and/or a HomePlug transceiver described a specification from the HomePlug Alliance.

The AP 110 may authenticate and configure the client device 130 to enable the client device 130 to access services and/or networks associated with the AP 110. The configurator 140 may aid and/or initiate authentication and/or configuration of the client device 130. Once authenticated, the client device 130 may establish a trusted and/or encrypted connection with the AP 110. The authentication process may involve public/private key encryption and, in some embodiments, may involve two distinct public/private key pairs. When configuring the client device 130, at least one of the distinct key pairs may be used to establish the encrypted connection between the client device 130 and the AP 110. In some embodiments, other security mechanisms may be used in addition to, or as an alternative for, the public/private key encryption described herein.

The client device 130 may be assigned a public/private Root Identity Key pair 137 (sometimes referred to as an identity key pair). For example, the Root Identity Key pair 137 may be assigned (e.g., programmed) to the client device 130 at its time of manufacture. Authentication of the client device 130 may begin as the configurator 140 determines the public Root Identity Key (from the Root Identity Key pair 137). In some embodiments, the configurator 140 may determine the public Root Identity Key of the client device 130 in an out-of-band manner. For example, the configurator 140 (which may be distinct from the client device 130) may be a smartphone that includes an optical device (e.g., camera) to scan labels and/or images. The client device 130 may include a label imprinted with a QR code 135. The QR code 135 may display the public Root Identity Key or may direct a scanning device to retrieve the public Root Identity Key from a remote device or service. Thus, the QR code 135 may directly or indirectly provide the public Root Identity Key of the client device 130 to the configurator 140. In some embodiments, a barcode label may replace the QR code 135.

In other embodiments, other out-of-band methods may be used to determine the public Root Identity Key. For example, the client device 130 may convey the public Root Identity Key to the configurator 140 via a near field communication (NFC) link or a Bluetooth Low Energy (BLE) link. Although only NFC links and BLE communication links are described herein, any other technically feasible communication link may be used.

In another out-of-band method, user intervention may provide the public Root Identity Key to the configurator 140. For example, the public Root Identity Key may be displayed on a human readable display of the client device 130 and input by a user of the client device 130 through a user interface (e.g., keyboard).

Next, the configurator 140 may provide the public Root Identity Key to the AP 110 through a previously established trusted connection and authenticates the client device 130 to the AP 110. In some embodiments, the configurator 140 may also provide a signed certificate to the AP 110. The signed certificate may prove authority and/or validity of the public Root Identity Key to other wireless devices. Configurator 140 may also store the public Root Identity Key of the client device 130.

The AP 110 may use the public Root Identity Key to discover and configure the client device 130. For example, the AP 110 may transmit a discovery message encrypted using the public Root Identity Key of the client device 130. The discovery message may include a public Key (of a public/private key pair) associated with the AP 110. In response to receiving the discovery message from the AP 110, the client device 130 may generate a public/private Transient Identity Key pair 138 (sometimes referred to as a Network Provisioning Key pair). The Transient Identity Key pair 138, which is distinct from the Root Identity Key pair 137, may be used to configure the client device 130 for communication with the AP 110. Thus, the Root Identity Key pair 137 may be used to authenticate the client device 130 and the Transient Identity Key pair 138 may be used to configure the client device 130. The client device 130 may generate the Transient Identity Key pair 138 using any technically feasible means. In some embodiments, the client device 130 may independently generate the Transient Identity Key pair 138. For example, the client device 130 may include a random number generator to generate the Transient Identity Key pair 138. In other embodiments, the client device 130 may receive a random number from the AP 110 and/or the configurator 140 that may act as a seed for generating of the Transient Identity Key pair 138.

The public Transient Identity Key (from the Transient Identity Key pair 138) may be provided to the AP 110 and/or the configurator 140. For example, after generating the Transient Identity Key pair 138, the client device 130 may transmit the public Transient Identity Key to the AP 110. The AP 110 may then forward the public Transient Identity Key to the configurator 140. In some embodiments, the public Transient Identity Key may also be stored within the configurator 140.

The client device 130 and the AP 110 may determine a shared Pairwise Master Key (PMK) to encrypt communications between the client device 130 and the AP 110. The shared PMK may be unique with respect to other shared PMKs determined by other client devices and may be based, at least in part, on the Transient Identity Key pair 138.

In some embodiments, after the shared PMK is determined, a configuration credential may be generated and stored within the client device 130. The configuration credential may include the shared PMK, a "connector", and/or a Certificate Authority (CA) public key. The "connector" may be a data structure that includes a network identifier (e.g., an identifier of the WLAN 120), a device identifier, and the public Transient Identity Key. The connector may introduce the client device 130 to other devices on a network. The CA public key may certify the validity of the public Transient Identity Key, the shared PMK or other information in the connector.

The client device 130 may communicate with the AP 110 using the public Transient Identity Key to complete the configuration of the client device 130 and determine a shared Pairwise Transient Key (PTK). For example, the client device 130 and the AP 110 may us a four-way handshake to determine the shared PTK. In performing four-way handshake the client device 130 and the AP 110 may use the Transient Identity Key pair 138 and/or the public/private key pair associated with the AP 110 to determine the shared PTK. The shared PTK, which may be distinct from the shared PMK, may be used to encrypt network communications between the client device 130 and the AP 110. The authentication and configuration of the client device 130 is described in more detail below in conjunction with FIGS. 2 and 3.

Figure 2:
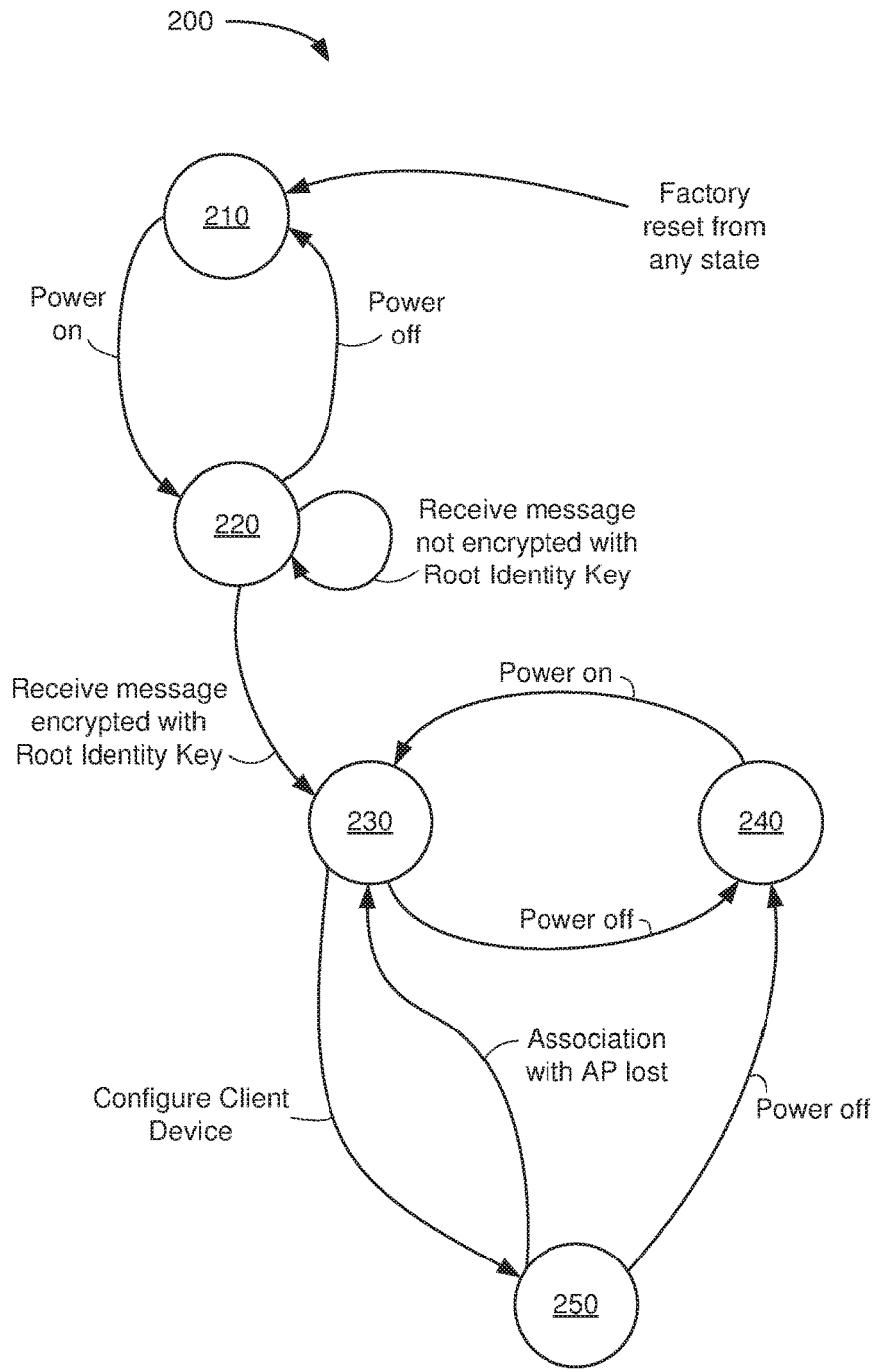
FIG. 2 shows a state diagram illustrating operating states of a client device of FIG. 1, in accordance with example embodiments.

FIG. 2 shows a state diagram 200 illustrating operating states of the client device 130 of FIG. 1, in accordance with example embodiments. The client device 130 begins in state 210. State 210 may be an initial state for the client device 130, such as when the client device 130 is initially manufactured and/or shipped from a factory. In state 210, the client device 130 may possess the Root Identity Key pair 137. The Root Identity Key pair 137 may be stored in a memory, such as a persistent memory of the client device 130. Those skilled in the art will appreciate that a persistent memory may be any memory that may retain data in the absence of power such as battery-backed memory, EEPROM, FLASH memory, ROM memory, or the like. The Root Identity Key pair 137 may be permanently associated with the client device 130. For example, when the client device 130 undergoes a factory reset to return the client device 130 to an initial state, the client device 130 may retain the Root Identity Key pair 137 (e.g., Root Identity Key pair may remain stored within the client device 130).

The client device 130 transitions to state 220 when the client device 130 is powered on. In state 220, the client device 130 is not yet authenticated. The client device 130 may begin the authentication process upon receiving a discovery message encrypted using the public Root Identity Key of the client device 130. As described above with respect to FIG. 1, the configurator 140 may determine the public Root Identity Key of the client device 130. After determining the public Root Identity Key, the configurator 140 may provide the public Root Identity Key to the AP 110. The AP 110 may then transmit a discovery message encrypted, at least in part, using the public Root Identity Key of the client device 130. The discovery message may also include the public key associated with the AP 110.

If the client device 130 receives a discovery message that is not encrypted, at least in part, with its public Root Identity Key, then the client device 130 may remain in state 220. On the other hand, if the client device 130 receives a discovery message that is encrypted, at least in part, with its public Root Identity Key, then the client device 130 may transition to state 230.

When the client device 130 is in state 230, the AP 110 has authenticated the client device 130 and conversely the client device 130 has authenticated the AP 110. After entering state 230, the client device 130 may generate the Transient Identity Key pair 138. The client device 130 and the AP 110 may then determine a shared PMK using the Transient Identity Key pair 138. In addition, the client device 130 may determine a configuration credential that may include a connector, a CA public key, and/or the shared PMK. The configuration credential may be stored in the client device 130. Thus, in state 230, Root Identity Key pair 137, the Transient Identity Key pair 138, and/or the configuration credential may be stored within a memory of the client device 130.

The client device 130 transitions to state 240 when the client device 130 is powered off. The power state of the client device 130 may not affect at least a portion of the memory of the client device 130. More specifically, the memory of the client device 130 may retain at least the Transient Identity Key pair 138, and the configuration credential when powered off. The client device 130 may transition back to state 230 when the client device 130 is powered on again.

The client device 130 transitions to state 250 when the client device 130 is configured to operate with the AP 110. In state 250, the client device 130 and the AP 110 may generate a shared PTK based, at least in part, on the Transient Identity Key pair 138, the public/private Key pair of with the AP 110, and/or the PMK. The shared PTK may be used to encrypt and/or decrypt network data traffic between the client device 130 and the AP 110. The shared PTK may be volatile. Thus, when the client device 130 transitions to state 240 (e.g., when power is removed from the client device 130), the shared PTK may be lost. In some embodiments, the client device 130 may transition from state 250 to state 230 if the wireless association to the AP 110 is lost or terminated or after a time-out period. For example, if the client device 130 moves beyond communication range of the AP 110, then the client device 130 may become unassociated with the AP 110. The shared PTK may be discarded and the client device 130 may enter state 230. In another example, a time-out period may expire, causing the PTK to be discarded and transitioning the client device 130 to state 230.

The client device 130 may return to state 210 from any other state when the client device 130 undergoes a factory reset operation. The factory reset operation may discard any determined shared keys as well as the Transient Identity Key pair 138. Thus, for some embodiments the client device 130 may retain only the Root Identity Key pair 137 after a factory reset operation.

Figure 3:
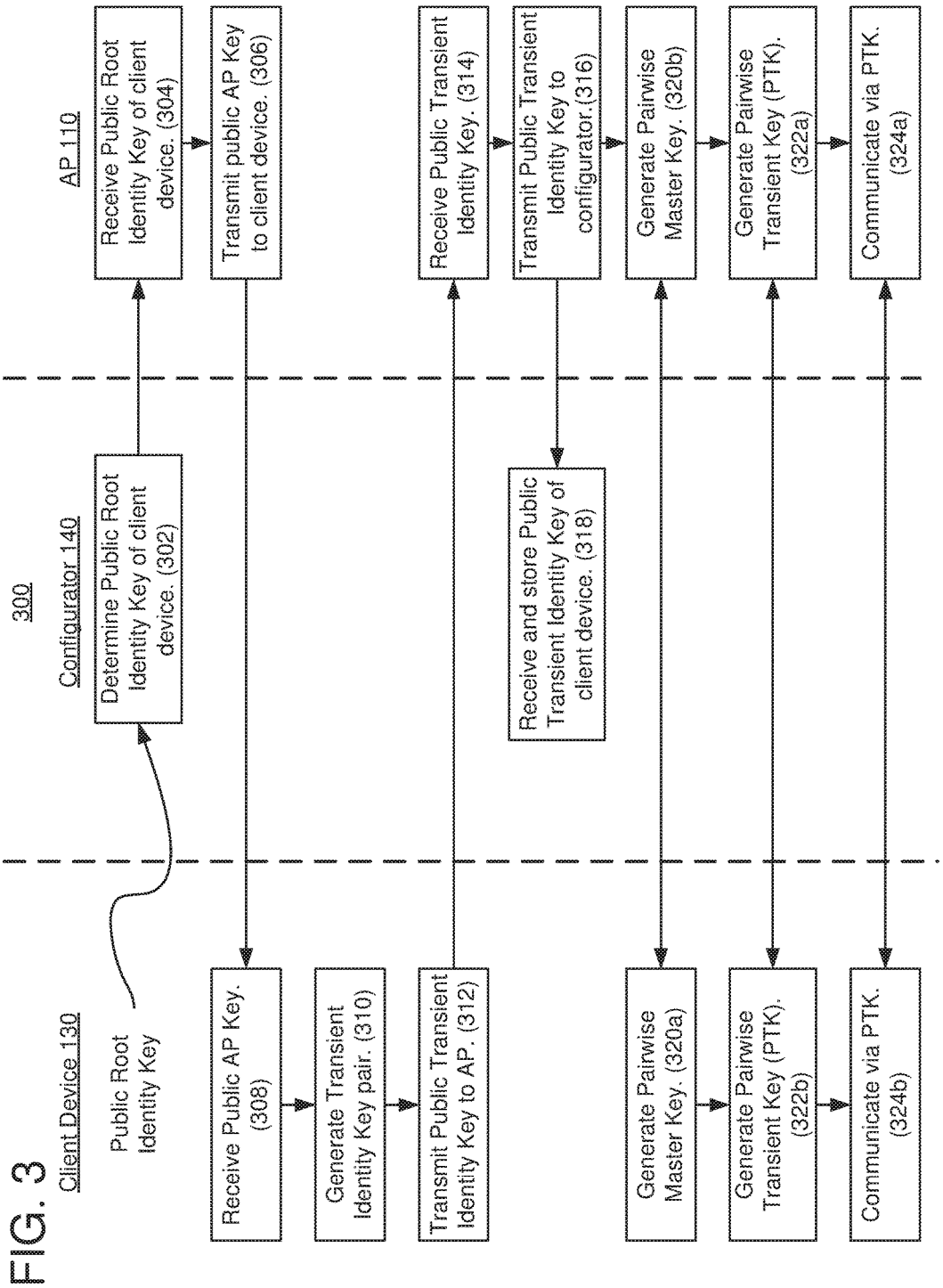
FIG. 3 shows an illustrative flow chart depicting an example operation for authenticating and configuring the client device of FIG. 1 for use with the access point of FIG. 1, in accordance with example embodiments.

FIG. 3 shows an illustrative flow chart 300 depicting an example operation for authenticating and configuring the client device 130 for use with the AP 110, in accordance with example embodiments. In some embodiments, the operation described herein may include additional processes, fewer processes, processes in a different order, processes in parallel, and/or some processes that are different. Referring also to FIGS. 1 and 2, the operation begins as the configurator 140 determines the public Root Identity Key of the client device 130 (302). The public Root Identity Key may be part of a Root Identity Key pair 137 associated with the client device 130 and may be determined in an out-of-band manner. Next, the AP 110 receives the public Root Identity Key of the client device 130 from the configurator 140 (304). In some embodiments, the AP 110 authenticates the client device 130 when the AP 110 receives the public Root Identity Key. Next, the AP 110 transmits a public Key of the AP 110 to the client device 130 encrypted, at least in part, using the public Root Identity Key of the client device 130 (306). In some embodiments, the public Key of the AP 110 may be transmitted to the client device 130 as part of a discovery message.

The client device 130 receives the public Key of the AP 110 (e.g., the "public AP key") (308). Since the public AP Key is encrypted, at least in part, using the public Root Identity Key of the client device 130, the client device 130 may use the private Root Identity Key to decrypt and receive the public AP Key. In this manner, the client device 130 may authenticate the AP 110 as being trustworthy.

In response to receiving the public AP Key, the client device 130 dynamically generates the Transient Identity Key pair 138 (310). The Transient Identity Key pair 138 may include a public key and a private key. The Transient Identity Key pair 138 may be used to configure the client device 130 for communication with the AP 110. Next, the client device 130 transmits the public Transient Identity Key to the AP 110 (312). In some embodiments, the client device 130 may encrypt the message including at least the public Transient Identity Key, using the public AP key. The AP 110 receives the public Transient Identity Key of the client device 130 (314), and transmits the public Transient Identity Key to the configurator 140 (316). The configurator 140 receives and stores the public Transient Identity Key of the client device 130 (318). The configurator 140 may use the public Transient Identity Key of the client device 130 to configure the client device 130 for use with other APs (described below in more detail in conjunction with FIG. 4).

The client device 130 and the AP 110 then cooperatively generate a shared PMK (320*a* and 320*b*). The client device 130 and the AP 110 may generate the shared PMK by exchanging one or more messages including and/or using the Transient Identity Key pair 138 and/or the public/private key pair of the AP 110. Next, the client device 130 and the AP 110 cooperatively generate the shared PTK (322*a* and 322*b*). The client device 130 and the AP 110 may generate the shared PMK by exchanging one or more messages including and/or using the shared PMK. Finally, the client device 130 and the AP 110 may communicate with each other using the shared PTK (324*a* and 324*b*). For example, the client device 130 and the AP 110 may exchange one or more messages encrypted and/or decrypted using the shared PTK.

Although described above as separate (e.g., distinct) devices, the configurator 140 and the AP 110 may be implemented within a single device. For example, a smartphone may execute software to function as a soft AP and software to function as the configurator 140. Thus, the smartphone may perform operations for both the AP 110 and the configurator 140. In some embodiments, the smartphone may include a camera to scan the QR code 135, NFC circuitry to receive the public Root Identity Key of the client device 130 through an NFC link, and/or BLE circuitry to receive the public Root Identity Key of the client device 130 through a BLE link. Furthermore, although operations of flow chart 300 describe authenticating and configuring a single client device 130, operations of flow chart 300 may be repeated multiple times to authenticate and configure any number of client devices.

Operations for adding an additional AP to the WLAN 120 may be simplified since the configurator 140 has stored the public Transient Identity Key of the client device 130 (at 318). For example, the configurator 140 may transmit the public Transient Identity keys of client devices in the WLAN 120 to the additional AP. The additional AP may authenticate and configure each of the client devices based, at least in part, on the public Transient Identity Key of each client device. In some embodiments, the additional AP may encrypt one or more messages to each client device using the client device's own public Transient Identity Key. The use of the client device's own public Transient Identity Key may indicate to each client device that the additional AP is a trusted AP.

Figure 4:
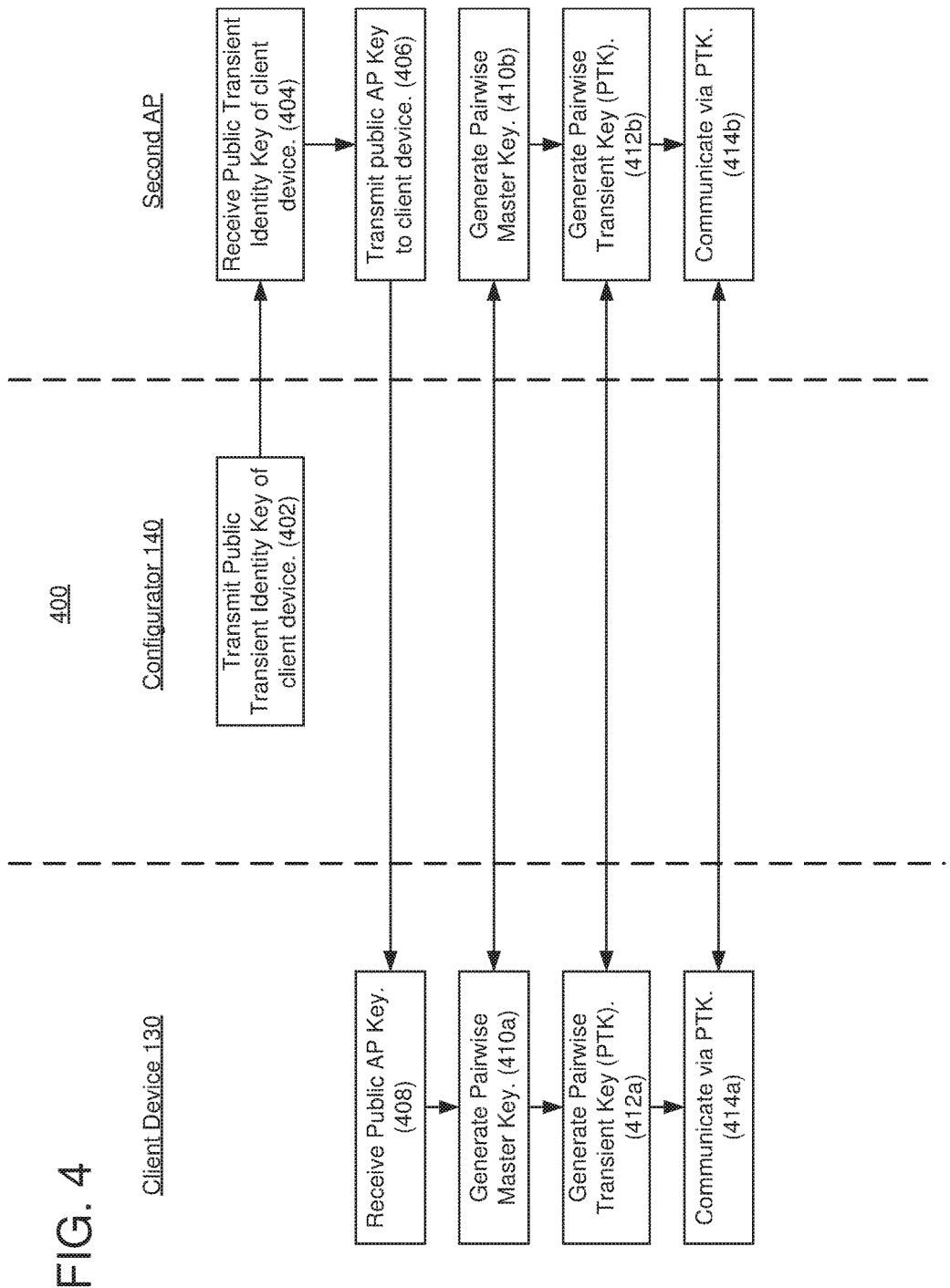
FIG. 4 shows an illustrative flow chart depicting an example operation for adding a second AP to an existing wireless local area network (WLAN), in accordance with example embodiments

FIG. 4 shows an illustrative flow chart 400 depicting an example operation for adding a second AP to an existing WLAN, in accordance with example embodiments. Referring also to FIGS. 1 and 2, operations begin as the configurator 140 transmits the public Transient Identity Key of the client device 130 to the second AP (402). As described above with respect to FIG. 3, the public Transient Identity Key of the client device 130 may be stored within the configurator 140. Thus, the configurator 140 may already have possession of the public Transient Identity Key of the client device 130. Next, the second AP receives the public Transient Identity Key of the client device 130 (404). In some embodiments, the configurator 140 may sign the message, including the public Transient Identity Key of the client device 130, to indicate to the second AP that the message is from a trusted source (e.g., the configurator 140). The second AP then transmits a public Key of the second AP (e.g., the public key of a public/private key pair of the second AP) to the client device 130 (406). In some embodiments, the message including the public Key of the second AP may be encrypted, at least in part, using the public Transient Identity Key of the client device 130.

The client device 130 receives the public Key of the second AP (408). The encryption using the public Transient Identity Key of the client device 130 may ensure the client device 130 that the received message is from a trusted source. Next, the client device 130 and the second AP cooperatively generate a shared PMK (410*a* and 410*b*). The client device 130 and the AP 110 may generate the shared PMK by exchanging one or more messages including and/or using the public/private key pair of the second AP and the Transient Identity Key pair 138. Next, the client device 130 and the second AP cooperatively generate a shared PTK (412*a* and 412*b*). The client device 130 and the AP 110 may generate the shared PTK by exchanging one or more messages including and/or using the shared PMK. Finally, the AP 110 and the second AP may communicate with each other using the shared Pairwise Transient Key (414*a* and 414*b*).

In some embodiments, the client device 130 may not have a Root Identity Key pair 137. However, the client device 130 may be authenticated and configured using a similar approach as described above with respect to FIGS. 2 and 3. For example, the client device 130 may generate the Transient Identity Key pair 138. The client device 130 may provide the public Transient Identity Key (of the Transient Identity Key pair 138) to the AP 110 in an out-of-band manner as described above with respect to FIGS. 1 and 3. The AP 110 may use the public Transient Identity Key to authenticate and configure the client device 130.

Figure 5:
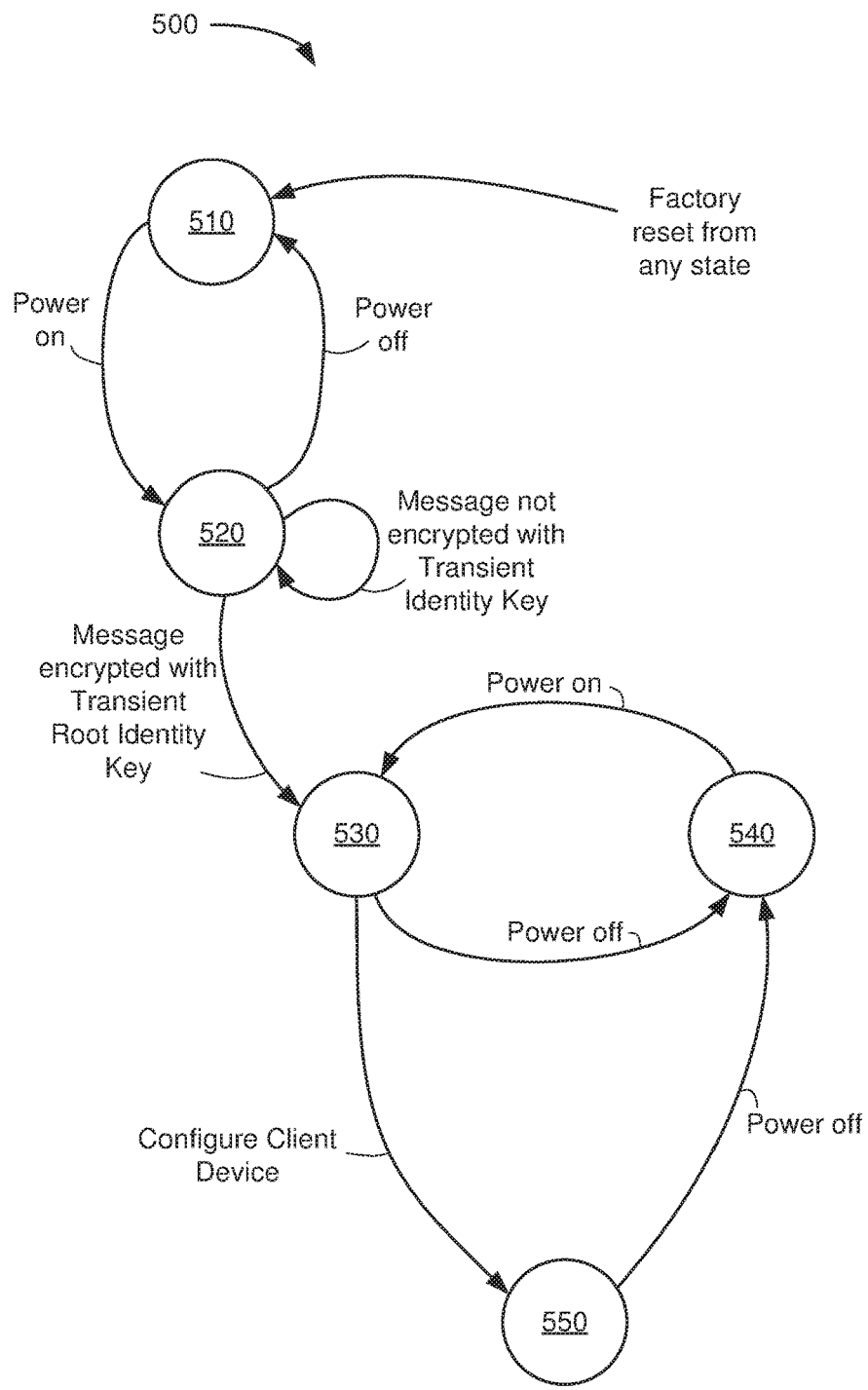
FIG. 5 shows another state diagram illustrating operating states of the client device of FIG. 1, in accordance with example embodiments.

FIG. 5 shows another state diagram 500 illustrating operating states of the client device 130 of FIG. 1, in accordance with example embodiments. The client device 130 begins in state 510. State 510 may be an initial state for the client device 130, such as a when the client device 130 is initially manufactured and/or shipped from a factory. In contrast to state 210 of FIG. 2, in state 510 the client device 130 does not possess the Root Identity Key pair 137.

The client device 130 transitions to state 520 when the client device 130 is powered on. As the client device 130 is powered on, the client device 130 may generate the Transient Identity Key pair 138. For example, the client device 130 may generate the Transient Identity Key pair 138 based, at least in part, on a random number generator included in the client device 130. The client device 130 may indirectly provide the public Transient Identity Key to the AP 110. For example, the client device 130 may display the public Transient Identity Key on a display. A user of the client device 130 may view the display and enter the public Transient Identity Key on a user interface (e.g., a keyboard or touchscreen). In another example, the client device 130 may transmit the Transient Identity Key though an NFC link or a BLE link to the AP 110. Thus, the public Transient Identity Key may be provided in an out-of-band manner to the AP 110.

In some instances, when the client device 130 is in state 520, the Transient Identity Key pair 138 may be lost when power is removed from the client device 130. Thus, when the client device 130 transitions to state 510, the Transient Identity Key pair 138 may be lost and regenerated when power is returned to the client device 130.

In state 520, the client device 130 may begin the authentication process upon receiving a discovery message from the AP 110 encrypted, at least in part, using the public Transient Identity Key of the client device 130. If the AP 110 attempts to authenticate the client device 130 without the public Transient Identity Key (e.g., if the discovery message is not encrypted, at least in part, using the public Transient Identity Key of the client device 130), then the client device 130 may remain in state 520.

On the other hand, if the discovery message is encrypted, at least in part, using the public Transient Identity Key of the client device 130, then the client device 130 transitions to state 530. The Transient Identity Key pair 138 may be used to determine a shared PMK in conjunction with public/private key pairs of the AP 110. Further, the client device 130 may generate a configuration credential that may include a connector, a CA public key, and/or the shared PMK. The configuration credential may be stored in the client device 130. For example, in state 530, the client device 130 may store the Transient Identity Key pair 138 and the configuration credential within a memory of the client device 130.

The client device 130 transitions to state 540 when the client device 130 is powered off. In state 540, the memory of the client device 130 may retain the Transient Identity Key pair 138 and the configuration credential. The client device 130 may transition back to state 530 when the client device 130 is powered on again.

The client device 130 transitions to state 550 when the client device 130 is configured to operate with the AP 110. The client device 130 and the AP 110 may generate a shared PTK based, at least in part, on the Transient Identity Key pair 138 and/or the public/private Key pair of the AP 110. The shared PTK may be used to encrypt and/or decrypt network data traffic for the WLAN 120. The shared PTK may be volatile. Thus, the shared PTK may be lost when the client device 130 transitions to state 540 (e.g., when power is removed from the client device 130).

The client device 130 may return to state 510 from any other state when the client device 130 undergoes a factory reset operation. The factory reset operation may discard any determined shared keys as well as the Transient Identity Key pair 138.

Figure 6:
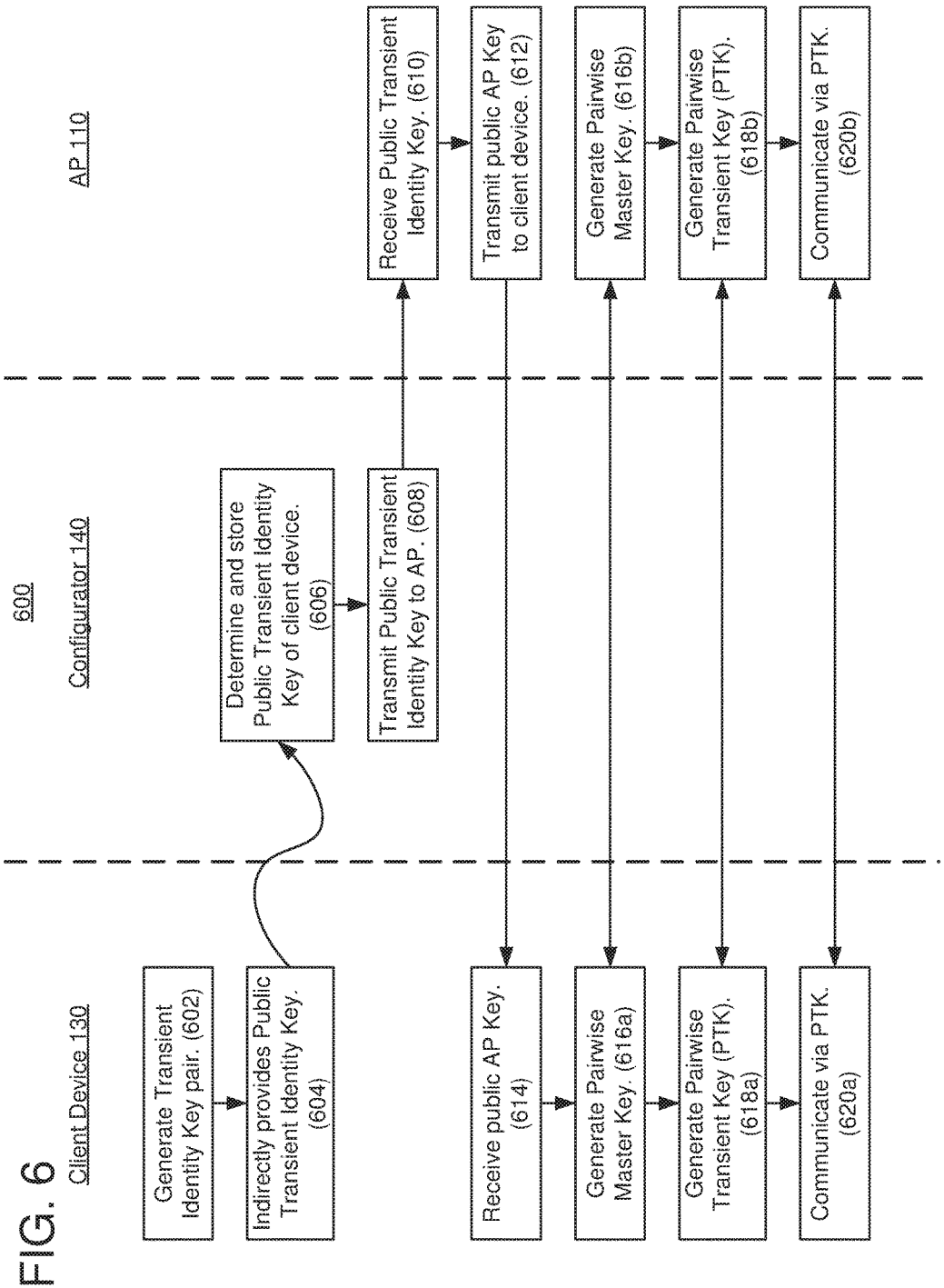
FIG. 6 shows an illustrative flow chart depicting another example operation for authenticating and configuring the client device of FIG. 1 for use with the access point of FIG. 1, in accordance with example embodiments.

FIG. 6 shows an illustrative flow chart 600 depicting another example operation for authenticating and configuring the client device 130 for use with the AP 110, in accordance with example embodiments. Referring also to FIGS. 1 and 5, operations begin as the client device 130 dynamically generates the Transient Identity Key pair 138 (602). The Transient Identity Key pair 138 may include a public key and a private key (e.g., a public Transient Identity Key and a private Transient Identity key). Further, the Transient Identity Key pair 138 may be used to authenticate the client device 130 to the AP 110. Next, the client device 130 indirectly provides the public Transient Identity Key to the AP 110 (604). For example, the public Transient Identity Key may be provided to the AP 110 in an out-of-band manner. In some embodiments, the client device 130 may include a human readable display that shows the public Transient Identity Key. In another embodiment, the client device 130 may include NFC circuitry and/or BLE circuitry to transmit the public Transient Identity Key to the configurator 140. The configurator 140 determines and stores the public Transient Identity Key of the client device 130 (606). For example, the configurator 140 may include NFC circuitry, BLE circuitry, and/or a user interface to receive the public Transient Identity Key.

The configurator 140 then transmits the public Transient Identity Key of the client device 130 to the AP 110 (608). For example, the configurator 140 may use a preexisting trusted link to transmit the public Transient Identity Key to the AP 110. In another example, the configurator 140 may sign a message including the public Transient Identity to prove that the message is from a trusted source. Next, the AP 110 receives the public Transient Identity key (610). In response to receiving the public Transient Identity Key, the AP 110 transmits the public Key of the AP 110 to the client device 130 (612). In some embodiments, the public Key of the AP 110 may be encrypted, at least in part, using the public Transient Identity Key.

The client device 130 receives the public Key of the AP 110 (614). In some embodiments, the message including the public Key of the AP 110 may be encrypted, at least in part, using the public Transient Identity Key of the client device 130, to ensure that the message may be trusted.

The client device 130 and the AP 110 then cooperatively generate a shared PMK (616a and 616b). The client device 130 and the AP 110 may generate the shared PMK by exchanging one or more messages that include and/or use the Transient Identity Key pair 138 and/or the public/private key pair of the AP 110. Next, the client device 130 and the AP 110 cooperatively generate shared the PTK (618a and 618b). The PTK may be generated when the client device 130 and the AP 110 exchange one or more messages including and or using the shared PMK. Finally, the client device 130 and the AP 110 may communicate with each other using the shared PTK (620a and 620b). For example, the client device 130 and the AP 110 may transfer messages that are encrypted and/or decrypted using the shared PTK.

Figure 7:
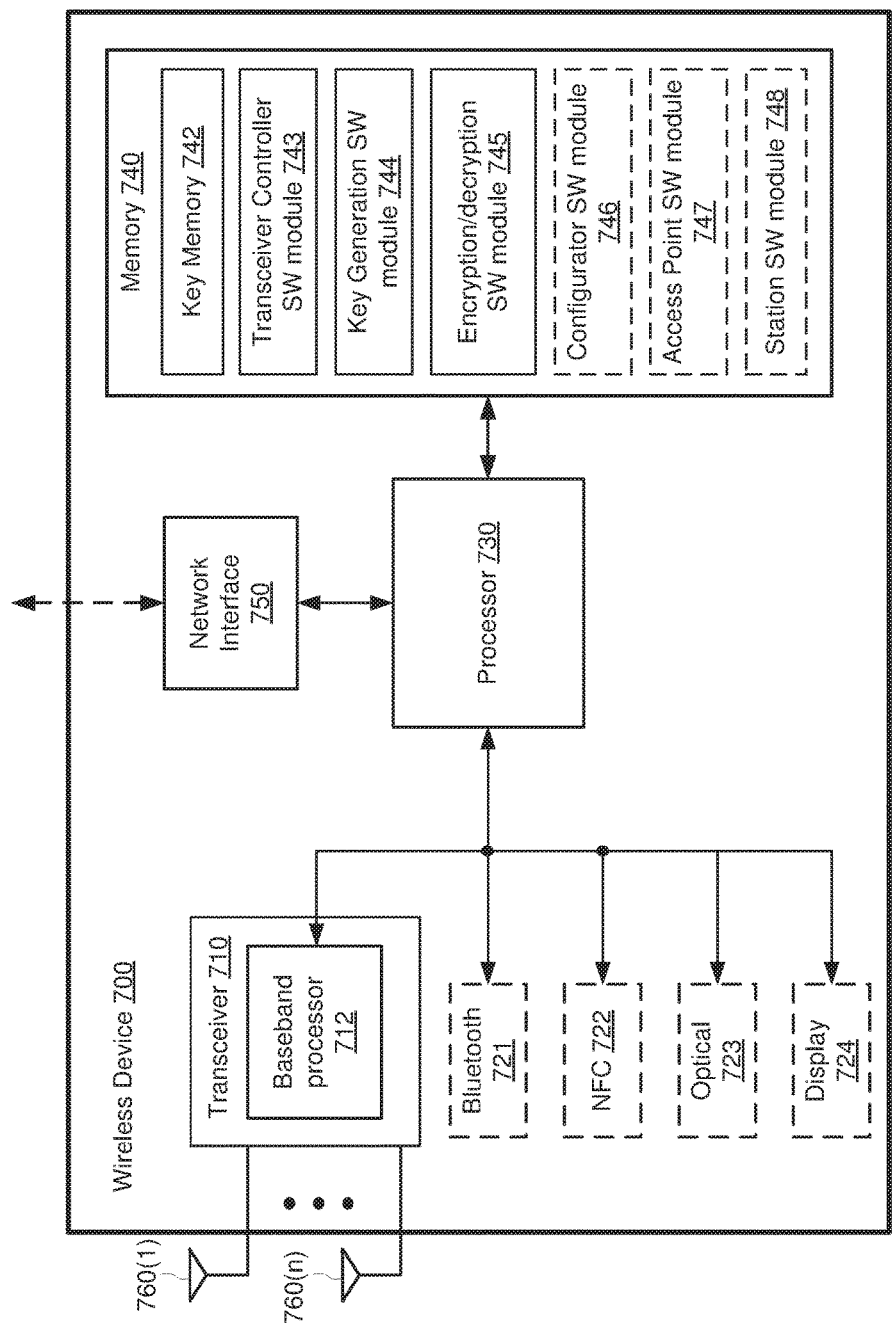
FIG. 7 shows an example wireless device that may be an embodiment of the AP, the client device, and/or the configurator of FIG. 1

FIG. 7 shows an example wireless device 700 that may be an embodiment of the AP 110, the client device 130, and/or the configurator 140 of FIG. 1. The wireless device 700 may include a transceiver 710, a processor 730, a memory 740, a network interface 750, and a number of antennas 760(1)-760(n). The transceiver 710 may be coupled to antennas 760(1)-760(n), either directly or through an antenna selection circuit (not shown for simplicity). The wireless device 700 may optionally include a Bluetooth module, 721, an NFC module 722, an optical module 723, and a display module 724 (optional modules shown with dashed lines). The transceiver 710 may be used to communicate wirelessly with one or more client devices, with one or more other APs, and/or with other suitable devices. Although not shown in FIG. 7 for simplicity, the transceiver 710 may include any number of transmit chains to process and transmit signals to other wireless devices via antennas 760(1)-760(n), and may include any number of receive chains to process signals received from antennas 760(1)-760(n). Thus, for example embodiments, the wireless device 700 may be configured for MIMO operations including, for example, SU-MIMO operations and MU-MIMO operations.

The transceiver 710 may include a baseband processor 712. The baseband processor 712 may be used to process signals received from the processor 730 and/or the memory 740 and to transmit the processed signals via one or more of antennas 760(1)-760(n). Additionally, the baseband processor 712 may be used to process signals received from one or more of antennas 760(1)-760(n) and to forward the processed signals to the processor 730 and/or the memory 740

The network interface 750 may access other networks and/or services. In some embodiments, the network interface 750 may include a wired interface. The network interface 750 may also communicate with a WLAN server (not shown for simplicity) either directly or via one or more intervening networks.

The processor 730, which is coupled to the transceiver 710, the network interface 750 and the memory 740, may be any suitable one or more processors capable of executing scripts or instructions of one or more software programs stored in the wireless device 700 (e.g., within the memory 740). For actual embodiments, the transceiver 710, the processor 730, the memory 740, and/or the network interface 750 may be connected together using one or more buses (not shown for simplicity).

In some embodiments, the Bluetooth module 721 may be coupled to the processor 730. The Bluetooth module 721 may transmit and/or receive Bluetooth and/or BLE signals. Data recovered from the received Bluetooth and/or BLE signals may be stored in the memory 740. In some embodiments, the processor 730 may provide data to transmit to the Bluetooth module 721.

Further, in some embodiments, the NFC module 722 may be coupled to the processor 730. The NFC module 722 may transmit and/or receive NFC signals. Data recovered from received NFC signals may be stored in the memory 740. In some embodiments, the processor 730 may provide data to transmit to the NFC module 722.

Still further, in some embodiments the optical module 723 may be coupled to the processor 730. The optical module 723 may include optics and circuitry to receive and process visual images such a QR codes and labels. Data from the optical module 723 may be stored in the memory 740.

Still further, in some embodiments the display module 724 may be coupled to the processor 730. The display module 724 may be used to display images such the QR code 135 (see FIG. 1) and labels. Data provided to the display module 724 may be initially stored in the memory 740.

The memory 740 may include a key memory 742 to store public, private, and/or shared keys. In some embodiments, the wireless device 700 may generate the public, private, and/or shared keys. In other embodiments, the public, private, and/or shared keys may be received through the transceiver 710, the Bluetooth module 721, the NFC module 722, and/or the optical module 723. In some embodiments, a public/private key pair (e.g., the public/private Root Identity Key pair 137) may be stored within key memory 742 at device manufacture.

The memory 740 may also include a non-transitory computer-readable medium (e.g., one or more nonvolatile memory elements, such as EPROM, EEPROM, Flash memory, a hard drive, and so on) that may store at least the following software (SW) modules:
- a transceiver controller software module 743 to transmit and receive wireless data via the transceiver 710;
- a key generation software module 744 to generate public, private and/or shared encryption keys;
- an encryption/decryption software module 745 to encrypt and/or decrypt data transmitted and/or received via the transceiver 710;
- an optional configurator software module 746 to perform operations associated with the configurator 140;
- an optional access point software module 747 to perform operations associated with the AP 110; and
- an optional station software module 748 to perform operations associated with the client device 130.

Each software module includes instructions that, when executed by the processor 730, cause the wireless device 700 to perform the corresponding functions. Thus, the non-transitory computer-readable medium of the memory 740 includes instructions for performing all or a portion of the operations described above with respect to FIGS. 3, 4, and 6.

As mentioned above, the processor 730 may be any suitable one or more processors capable of executing scripts or instructions of one or more software programs stored in the wireless device 700 (e.g., within the memory 740). For example, the processor 730 may execute the transceiver controller software module 743 to facilitate the transmission and/or reception of data between the wireless device 700 and other wireless devices (not shown for simplicity).

The processor 730 may execute the key generation software module 744 to generate keys for use by the wireless device 700. For example, the key generation software module 744 may generate the Transient Identity Key pair 138 and/or shared keys such as the PMK and the PTK. Keys generated by the key generation software module 744 may be stored in the key memory 742.

The processor 730 may execute the encryption/decryption software module 745 to encrypt and/or decrypt messages transmitted and/or received through the transceiver 710. For example, the encryption/decryption software module 745 may perform public/private key encryption and/or decryption. In addition, the processor 730 may execute the encryption/decryption software module 745 to verify and/or generate certificates and digital signatures.

The processor 730 may optionally execute the configurator software module 746 to perform operations associated with the configurator 140. For example, the processor 730 may execute the configurator software module 746 to determine a public Root Identity Key of the client device 130 via the Bluetooth module 721, the NFC module 722, and/or the optical module 723. In some embodiments, the determined public Root Identity Key may be stored in key memory 742 or transmitted to another wireless device.

The processor 730 may optionally execute the access point software module 747 to perform operations associated with the AP 110. For example, the processor 730 may execute the access point software module 747 to receive a public Root Identity Key from the configurator 140, perform operations to authenticate the client device 130, transfer data, and/or messages between wireless devices, and any other tasks associated with access point operation.

The processor 730 may optionally execute the station software module 748 to perform operations associated with the client device 130. For example, the processor 730 may execute the station software module 748 to authenticate with the AP 110, generate the Transient Identity Key pair 138, transfer data, and perform any other tasks that may be associated with station operation.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences, or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of wireless communication, comprising:
   receiving, by a first wireless device, a discovery message from an access point (AP), wherein the discovery message is encrypted using a public root identity key of the first wireless device;
   generating, in response to receiving the discovery message from the AP, a first public and private transient identity key pair;
   transmitting a public key of the first public and private transient identity key pair to the AP;
   generating a shared pairwise master key based, at least in part, on the first public and private transient identity key pair;
   generating a shared pairwise transient key based, at least in part, on the shared pairwise master key;
   encrypting a message based, at least in part, on the shared pairwise transient key; and
   transmitting the encrypted message to the AP.

2. The method of claim 1, wherein the discovery message from the AP includes a public key associated with the AP.

3. The method of claim 1, further comprising transmitting the public root identity key of the first wireless device to a second wireless device distinct from the AP, wherein receiving the discovery message from the AP is in response to transmitting the public root identity key of the first wireless device to the second wireless device.

4. The method of claim 1, further comprising decrypting, at least in part, the discovery message from the AP using a private root identity key of the first wireless device.

5. The method of claim 4, wherein the private root identity key of the first wireless device is distinct from the first public and private transient identity key pair.

6. The method of claim 4, wherein the private root identity key of the first wireless device is assigned to the first wireless device by a device manufacturer.

7. The method of claim 1, wherein the shared pairwise master key is based, at least in part, on a public and private key pair associated with the AP.

8. The method of claim 1, further comprising:
   dynamically generating, by the first wireless device, a second public and private transient identity key pair in response a reset of the first wireless device, wherein the second public and private transient identity key pair is distinct from the first public and private transient identity key pair, and is based, at least in part, on a public key associated with the AP.

9. A first wireless device comprising:
   a transceiver;
   a processor; and
   a memory storing instructions that when executed by the processor cause the first wireless device to:
      receive a discovery message from an access point (AP), wherein the discovery message is encrypted using a public root identity key of the first wireless device;
      generate, in response to the discovery message received from the AP, a first public and private transient identity key pair;
      transmit a public key of the first public and private transient identity key pair to the AP;
      generate a shared pairwise master key based, at least in part, on the first public and private transient identity key pair;
      generate a shared pairwise transient key based, at least in part, on the shared pairwise master key;
      encrypt a message based, at least in part, on the shared pairwise transient key; and
      transmit the encrypted message to the AP.

10. The first wireless device of claim 9, wherein the discovery message from the AP includes a public key associated with the AP.

11. The first wireless device of claim 9, further comprising instructions to cause the first wireless device to transmit the public root identity key of the first wireless device to a second wireless device distinct from the AP, wherein the discovery message from the AP is received in response to the transmitted public root identity key of the first wireless device.

12. The first wireless device of claim 9, further comprising instructions to cause the first wireless device to decrypt, at least in part, the discovery message from the AP using a private root identity key of the first wireless device.

13. The first wireless device of claim 12, wherein the private root identity key of the first wireless device is distinct from the first public and private transient identity key pair.

14. The first wireless device of claim 12, wherein the private root identity key of the first wireless device is assigned to the first wireless device by a device manufacturer.

15. The first wireless device of claim 9, wherein the shared pairwise master key is based, at least in part, on a public and private key pair associated with the AP.

16. The first wireless device of claim 9, further comprising instructions to cause the first wireless device to:
   dynamically generate a second public and private transient identity key pair in response to a reset of the first wireless device, wherein the second public and private transient identity key pair is distinct from the first public and private transient identity key pair, and is based, at least in part, on a public key associated with the AP.

17. A first wireless device comprising:
   means for receiving a discovery message from an access point (AP), wherein the discovery message is encrypted using a public root identity key of the first wireless device;
   means for generating a first public and private transient identity key pair in response to receiving the discovery message from the AP;
   means for transmitting a public key of the first public and private transient key pair to the AP;
   means for generating a shared pairwise master key based, at least in part, on the first public and private transient identity key pair;
   means for generating a shared pairwise transient key based, at least in part, on the shared pairwise master key;
   means for encrypting a message based, at least in part, on the shared pairwise transient key; and
   means for transmitting the encrypted message to the AP.

18. The first wireless device of claim 17, wherein the discovery message from the AP includes a public key associated with the AP.

19. The first wireless device of claim 17, further comprising means for transmitting the public root identity key of the first wireless device to a second wireless device distinct from the AP, wherein the discovery message from the AP is received in response to transmitting the public root identity key of the first wireless device to the second wireless device.

20. The first wireless device of claim 17, further comprising means for decrypting, at least in part, the discovery message from the AP using a private root identity key of the first wireless device.

21. The first wireless device of claim 20, wherein the private root identity key of the first wireless device is distinct from the first public and private transient identity key pair.

22. The first wireless device of claim 20, wherein the private root identity key of the first wireless device is assigned to the first wireless device by a device manufacturer.

23. The first wireless device of claim 17, wherein the shared pairwise master key is based, at least in part, on a public and private key pair associated with the AP.

24. The first wireless device of claim 17, further comprising:
   means for dynamically generating a second public and private transient identity key pair in response to a reset of the first wireless device, wherein the second public and private transient identity key pair is distinct from the first public and private transient identity key pair, and is based, at least in part, on a public key associated with the AP.

* * * * *